United States Patent
Lagerström et al.

(10) Patent No.: US 6,826,398 B1
(45) Date of Patent: Nov. 30, 2004

(54) SYSTEM FOR PROCESSING SERVICE DATA IN TELECOMMUNICATIONS SYSTEM

(75) Inventors: Lars Lagerström, Singapore (SG); Bodil Riihinen, North Andover, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/367,830

(22) PCT Filed: Mar. 12, 1998

(86) PCT No.: PCT/FI98/00222

§ 371 (c)(1),
(2), (4) Date: Oct. 8, 1999

(87) PCT Pub. No.: WO98/41038

PCT Pub. Date: Sep. 17, 1998

(30) Foreign Application Priority Data

Mar. 13, 1997 (FI) .................................................. 971059

(51) Int. Cl.[7] ........................ H04Q 7/20; H04M 1/64; H04M 15/00; H04M 3/00; H04M 3/42
(52) U.S. Cl. ..................... 455/433; 455/457; 455/466; 379/88.23; 379/114.02; 379/130; 379/196; 379/201.01; 379/201.04; 709/229; 709/220; 709/231; 340/7.22; 348/14.08
(58) Field of Search ................................ 455/414, 445, 455/461, 466, 457, 433; 379/88.23, 114.03, 196, 130, 201.04, 201.01, 373.02, 242; 709/229, 220, 231; 340/7.22; 348/14.08

(56) References Cited

U.S. PATENT DOCUMENTS

| 5,027,384 | A | * | 6/1991 | Morganstein ............ 379/88.23 |
| 5,519,772 | A | | 5/1996 | Akman et al. |
| 5,544,236 | A | | 8/1996 | Andruska et al. |
| 5,572,581 | A | | 11/1996 | Sattar et al. |
| 5,581,601 | A | | 12/1996 | Abramowski et al. |
| 5,799,072 | A | * | 8/1998 | Vulcan et al. ......... 379/114.02 |
| 5,802,157 | A | * | 9/1998 | Clarke et al. ................ 379/196 |
| 5,903,732 | A | * | 5/1999 | Reed et al. .................. 709/229 |
| 5,958,016 | A | * | 9/1999 | Chang et al. ................ 709/229 |
| 6,011,579 | A | * | 1/2000 | Newlin ..................... 348/14.08 |
| 6,047,051 | A | * | 4/2000 | Ginzboorg et al. ......... 379/130 |
| 6,091,808 | A | * | 7/2000 | Wood et al. ........... 379/201.04 |
| 6,125,281 | A | * | 9/2000 | Wells et al. ................. 455/466 |
| H1895 | H | * | 10/2000 | Hoffpauir et al. ........... 455/433 |
| H1896 | H | * | 10/2000 | Hoffpauir et al. ........... 455/433 |

(List continued on next page.)

FOREIGN PATENT DOCUMENTS

| WO | WO 92/11724 | 7/1992 |
| WO | WO 94/05111 | 3/1994 |
| WO | WO 94/23523 | 10/1994 |
| WO | WO 97/23988 | 7/1997 |
| WO | WO 97/44943 | 11/1997 |

*Primary Examiner*—William Cumming
(74) *Attorney, Agent, or Firm*—Squire, Sanders & Dempsey LLP

(57) ABSTRACT

A system by which external users, such as subscribers and service providers, can update their service data is disclosed. The system permits users to update their service data in a secure and controlled manner on a self-service basis in an intelligent network or other telecommunications network. An access system separate from the actual telecommunications services managing network elements is implemented in the invention, the access system providing the customers and service providers with an open interface to these network elements through a public data network. The access system controls access to the actual network elements by, for example, authenticating the party requesting access, checking whether the requesting party is associated with the data he/she desires to manipulate, and/or checking to which processing operations the requesting party is entitled. The users can thus access their own service data in the network elements managing the data in a manner controlled by the access system.

6 Claims, 2 Drawing Sheets

U.S. PATENT DOCUMENTS

| | | | |
|---|---|---|---|
| H1897 H | * 10/2000 | Fletcher et al. | 455/433 |
| H1918 H | * 11/2000 | Hoffpauir et al. | 379/242 |
| 6,456,854 B1 | * 9/2002 | Chern et al. | 455/457 |
| 6,545,589 B1 | * 4/2003 | Fuller et al. | 340/7.22 |
| 2002/0181694 A1 | * 12/2002 | Mani | 379/373.02 |
| 2002/0181863 A1 | * 12/2002 | Mani | 379/201.01 |
| 2002/0184346 A1 | * 12/2002 | Mani | 709/220 |
| 2002/0188744 A1 | * 12/2002 | Mani | 709/231 |

* cited by examiner

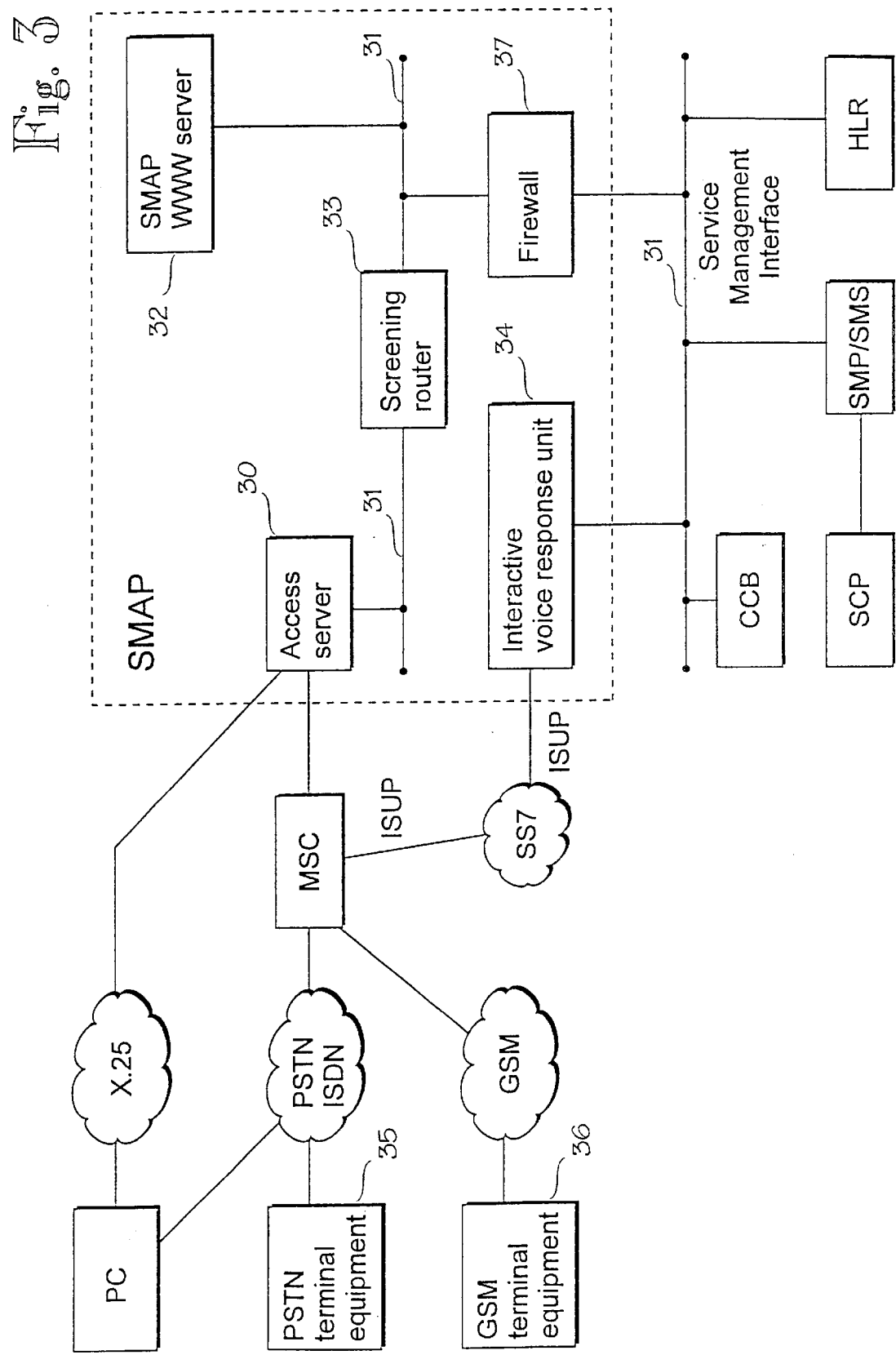

SYSTEM FOR PROCESSING SERVICE DATA IN TELECOMMUNICATIONS SYSTEM

BACKGROUND OF THE INVENTION.

1. Field of the Invention

The invention relates to processing of telecommunications service data in a telecommunications network, particularly in an intelligent network.

In order to make the following description easier to understand, some terms used below will be defined first. A customer and a subscriber denote a person or a community that purchases a (intelligent network) service and uses it. A service provider or user denotes a person or a community that creates the service according to the requirements of the customer or the subscriber. An operator denotes a person or a community that operates a telecommunications network. A manufacturer denotes a person or a community that manufactures the hardware and software by means of which the operator or service provider creates the (intelligent network) service.

2. Description of the Related Art

In telecommunications networks, intelligence relates to the ability to access stored data, process it and make decisions on the basis of it. Present telecommunications networks, such as public switched telephone networks (PSTN), are intelligent to some extent since they are able to process stored data in connection with routing a call, for instance. A typical "intelligent" facility or service in the present telecommunications networks is a conditional call forwarding, which requires analysis of the call state and routing of the call onward according to the stored service profile of the call forwarding. Depending on the telecommunications system, these facilities and subscriber service profiles associated with them have been maintained in different network elements, such as subscriber databases in mobile communications networks.

However, intelligent facilities of this type have been an integral part of the primary network, whereby to alter the facilities or to increase the number of them has required, for instance, software updating in every network exchange. This is the reason for developing an intelligent network (IN). The intelligent network is a network architecture connected to the primary network, enabling faster, easier and more flexible service implementation and service control. This is performed by transferring the service control from the telephone exchange to a separate functional unit of the intelligent network. The services thus become independent of the primary network operation, and the primary network structure and software do not have to be changed when services are altered or added. In addition to the actual network operator, an intelligent network may comprise several service providers.

The intelligent network architecture can be applied to most telecommunications networks, such as public switched telephone networks (PSTN), packet switched public data networks (PSPDN) and integrated services digital networks (ISDN) and broadband-ISDNs (B-ISDN). Independently of the network technology, the purpose of the intelligent network architecture is to facilitate the creation, control and management of new teleservices.

In fixed networks, intelligent network standardization has progressed rapidly in recent years. For example, the CCITT Q.1290 and prETS 300 374-1, Intelligent Network Capability Set 1 (CS1) are specifications related to intelligent networks. These standards define a certain functional and hierarchical model for the intelligent network. FIG. 1 illustrates the principle of the intelligent network and some of its components. The intelligent network also comprises other functional or physical units, which are not, however, significant as far as the present invention is concerned.

In the intelligent network model, service control has been transferred from the exchange of the primary network (SW) to a service control point (SCP) in the intelligent network. The SCP comprises the required database and service logic programs (SLP), in other words the software to provide the logic structure of a particular service (service logic). A service switching point (SSP) is an exchange, for instance a primary network exchange (SW) fulfilling the service switching function (SSF), in other words the identification of the intelligence network service and the triggering of interaction with the service control point (SCP). FIG. 1 also shows the subscriber equipment (SE) of the primary network.

The functions related to the intelligent network service management are described below.

A service data point (SDP) comprises customer and network data used while performing a service. Functionally, the SDP comprises a service data function (SDF). It comprises data used by the service logic programs for providing individual services. The SCP or SMP/SMS has direct access to the SDP.

The service management point (SMP) or the service management system (SMS) performs service management control, service provision control and service deployment control. Examples of its functions are database management, network testing, network traffic management and network data collection. Functionally, the SMP comprises a service management function (SMF) and optionally, a service management access function (SMAF) and a service creation environment function (SCEF).

The service creation environment (SCEP) is employed to define, develop and test an intelligent network service and to input it to the SMP. Functionally, it comprises a service creation environment function (SCEF). The SCEP may interact directly with the SMP.

The service management access point (SMAP) provides some selected users, such as service managers and customers, with a connection to the SMP. Functionally, the SMAP comprises a service management access function (SMAF). The SMAP interacts directly with the SMP.

Subscription service data of intelligent networks has previously been managed through the customer data systems of the operator, or through the SMAP or by terminals or work stations connected directly to the SMP or the SMS of the intelligent network, such as work stations WS1 and WS2 in FIG. 1. International PCT Applications WO9211724, WO9325035 and WO9405111, for instance, disclose examples of this sort of implementation.

With an increase in the use of the intelligent network services, the need for frequent updating of service related data has also increased. This has led to a growing load on the operator personnel and customer care systems when prior art solutions are employed. A need has thus arisen to allow external users, such as subscribers and service providers, to update their service data on a self-service basis. The prior art solutions are, however, unsuitable for this mainly for reasons of security, capacity and human resources.

SUMMARY OF THE INVENTION.

It is an object of the invention to provide the users and customers with the ability to input, view and update their service related data in a secure and controlled manner.

It is a further object of the invention to provide, within a management access system, the operators with an open interface enabling different service management and billing systems to be added flexibly.

This is achieved by a system for processing service data in network elements managing the telecommunications services of the telecommunications network. The system is characterized in that the system is connected to one or several network elements managing the telecommunications services, the system comprises an open protocol interface to a public data network, through which the customers and service providers are able to selectively access their service data in the telecommunications network.

The invention provides an access system separate from the actual network elements managing the telecommunications services, said system providing the customers and service providers with an open interface to these network elements through a public data network. Controlled by the access system of the invention, they can access their service data through this open interface in network elements managing the data. The access system of the invention and an interface open to use provide the customers and service providers with an opportunity to access their service data and process it on a normal computer and through a public data network. Special terminals employed in prior art solutions can thus be avoided and the self-service function of service data modification and updating can be extended to apply to an almost unlimited number of customers or service providers. However, the access system of the invention is always between the customer and the actual network managing the service data; it is impossible to establish a direct and uncontrolled connection. The access system is arranged to control the access to the actual network elements by for example authenticating the party requesting access, by verifying whether the requesting party is associated with the data the party wants to manipulate, and/or by verifying to which processing operations the requesting party is entitled. A typical implementation is that an operator has access to all data, a service provider has access to the data of its customers and finally, a customer has access merely to his/her own data. Many other solutions may be used additionally or alternatively in order to ensure security.

In a preferred embodiment of the invention a user interface is implemented by world wide web (WWW) application in a WWW server providing the customers and service providers with access to their service data by means of an ordinary WWW browser. This interface is the preferred choice when large amounts of data, such as numbering plans and routing lists, is updated.

In another embodiment of the invention the access system further comprises interactive voice response apparatus which is connected to the exchange of the telecommunications network to provide the customers with an interface through which they have access to their service data in the telecommunications network by means of a fixed or mobile subscriber terminal. The voice response apparatus can, for example, provide a customer with voice prompt menus to which the customer is requested to response by dual tone multi-frequency responses generated from a subscriber terminal keyboard. The voice response apparatus can subsequently receive the dual tone multi-frequency response of the customer and deliver the response in the desired form to at least one said network element managing telecommunications services. This interface is preferred for updating limited amounts of data, such as when service features are activated/deactivated, or when choices are made between screening lists and routing alternatives, etc.

In the preferred embodiment of the invention the access system further comprises a high-level generic interface between the access system applications and the network elements managing the telecommunications services and optionally between customer care and billing systems of the operators. This interface is here referred to as a service management interface (SMI). In the present invention this SMI can be employed by a WWW application in a WWW server and an interactive voice response application in an interactive voice response unit in order to provide access to the SMP database or other corresponding element. In the preferred embodiment of the invention, the data transfer architecture over the SMI is a distributed customer/server solution based on common object request broker architecture (CORBA). This architecture allows the applications to communicate with each other independently of where they are located or who has designed them. This architecture provides a rough basis for open, distributed environments that are based on standards and are capable of growing as the operator's requirements increase.

The present invention enables service data modification on a self-service basis, which diminishes the load on operator personnel and customer care systems.

BRIEF DESCRIPTION OF THE DRAWINGS.

An advantage of the invention is that the network elements managing service data require a minimum number of changes when a new service is introduced in the network, since service related data can be inputted and updated through the access system of the invention. The invention will be described in the following by means of the preferred embodiments with reference to the accompanying drawings, in which FIG. 3 shows the access system of the preferred embodiment of the invention.

DETAILED DESCRIPTION OF THE INVENTION.

In principle, the present invention can be applied in any telecommunications system whatsoever when external users, such as service producers, service subscribers and service users, are to be provided with access to their own service data in a telecommunications system. The most typical embodiment of the invention is in conjunction with the service management point (SMP), in other words service management system (SMS) of an intelligent network.

Alternatively or simultaneously, access can also be provided to network elements managing service data of other telecommunications systems, such as the subscriber registers of mobile networks.

Figure 1:
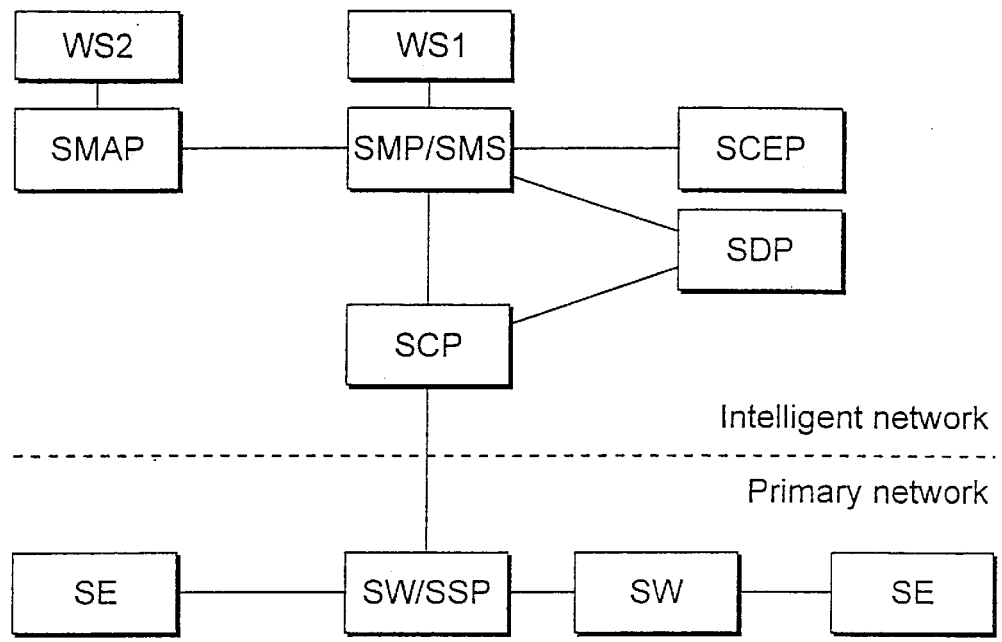
FIG. 1 shows a block diagram of the intelligent network architecture.
Figure 2:
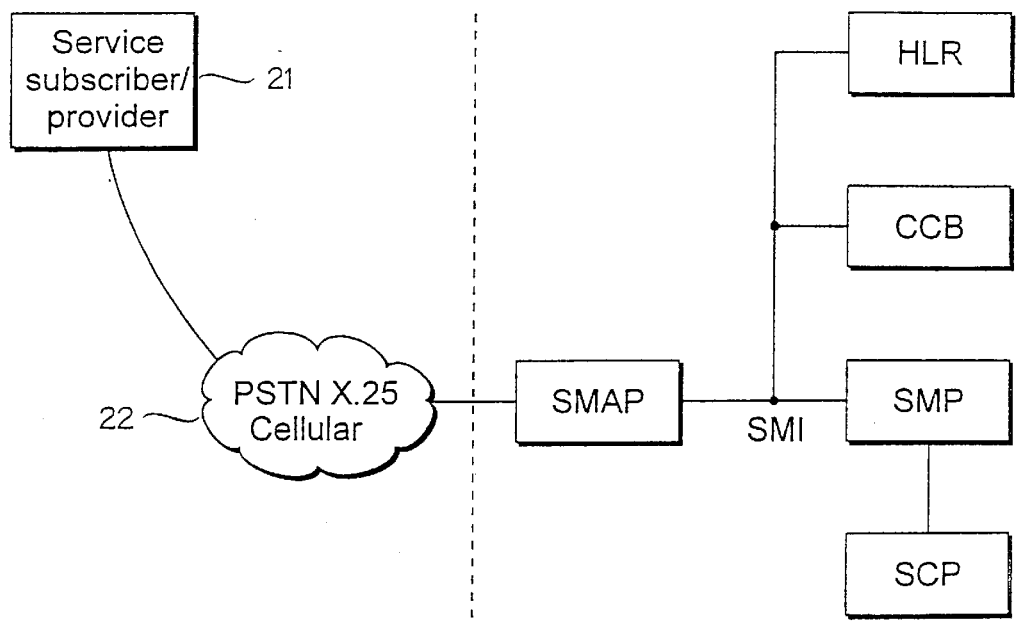
FIG. 2 illustrates the basic principle of the access system of the invention.

FIG. 2 illustrates the architecture of the access system of the invention, in the following referred to as the service management access point (SMAP), in connection with an intelligent network. In accordance with the basic idea of the invention, the SMAP provides service providers or customers 21 with access to the service data of the service management point (SMP) through a public telephone network, such as the PSTN or the ISDN, a cellular radio network (such as the GSM) or a public data network (X.25, the Internet) 22 and an open interface. Furthermore, the service data of the customer care and billing (CCB) and the service data of the service control point (SCP) can be further processed through the internal service management interface (SMI) of the access system. Furthermore, the SMAP can provide access to a network element of another telecommunications network, such as the home location register (HLR) comprising data related to telecommunications services. The dotted line in FIG. 2 represents the border between the equipment of the intelligent network operator and the outside world.

The system of FIG. 2 could be used in the following manner, for example. A new subscriber and the services he/she wants to subscribe to are first supplied to the CCB system. This can be performed by the computer 21 of the service provider through a public (data) network 22 and the SMAP access system of the invention and the service management interface (SMI). This can also be performed locally through a work station or the like in connection with the CCB. It is necessary to supply the subscriber information to the billing system (CCB) in order to be able to charge for the services later on. The CCB extracts the user and service identification information and employs this information to register the subscriber and subscriptions in the service management point (SMP). The subscriber, in other words the customer, is now able to input his/her own service related data through the SMAP of the invention by using a personal computer (PC) or a subscriber terminal of a fixed telephone network or mobile network. The subscriber can also use the terminal of a fixed or mobile network to activate services or choose between some alternatives, for example.

FIG. 3 illustrates in greater detail the SMAP network architecture of the invention and also shows some SMAP network elements and their interconnections. This preferred embodiment of the invention is here shown as adapted to an intelligent network and the GSM mobile system.

In FIG. 3, the SMAP network elements are the following. A LAN access server 30 is a normal LAN server providing access from a public data network (such as X.25) to the local network LAN 31 of the operator.

The SMAP world wide web (WWW) server is a network element connected to a LAN 31, in which element is run a WWW server application providing the user with access to service data through a graphical user interface using a normal WWW browser. The SMAP WWW application comprises an HTML based interface enabling interaction through a WWW server 32 and the SMI to service data stored on the SMP or other network element. This user interface is the preferred choice when large amounts of data, such as screening lists, numbering plans and time-dependent routing lists are updated. The server 32 may be a UNIX server from the Hewlett-Packard 9000 series, for instance.

In the LAN network 31 there is preferably a screening router 33 between the access server 30 and the WWW server 32. The purpose of the router 33 is to prevent all non-HTTP type traffic from accessing the WWW server 32. The advantage in this is that the SMAP system can be attacked (an unauthorized access, for instance) only by HTTP traffic using a WWW browser, for instance. All traffic of another type is unsuitable for breaking into the system.

It is to be noted that although WWW technology is employed in the SMAP architecture in FIG. 3, this does not mean that connecting the SMAP to the Internet itself is compulsory. For security reasons, the operator may prefer an intranet approach, whereby the SMAP can be connected to the operator's own intranet.

It is also to be noted that the access server 30 may already exist in the LAN network of the operator. Alternatively, the access server 30 can be implemented as a part of an existing network element. For example the Nokia Datacommunications Server (DaCS), which can be integrated into the Nokia mobile exchange DX200 MSC may operate as the server 30. Moreover, there are many products from other manufacturers available for fixed and cellular networks.

In the LAN network 31, between the SMP/SMS and the WWW server 32 there is a firewall 37 preventing unauthorized access to SMP data. The firewall 37 can be implemented by an DEC Alpha UNIX server, for instance. The firewall 37 provides the highest security level. It can be configured to allow merely application specific traffic. It mediates traffic between a public and private network in such a manner that only reliable traffic can enter the private local area network. The firewall 37 changes the IP addresses of the data communication packets in such a manner that the hosts and customers are unaware of the true source address of each packet. In order to detect attempted fraud, the firewall is also able to log every attempt to access the SMP.

An interactive voice response unit (IVR) 34 produces an interactive voice response interface which enables the users to interact with the SMAP system by means of voice prompts and dual tone multi-frequency (DTMF) responses. As has been illustrated in FIG. 3, the interactive voice response unit is connected to a GSM mobile exchange (MSC) on an ISUP interface through a signalling system 7 (SS7). It is to be noted, however, that the SMAP architecture is designed for both fixed and cellular networks. The MSC can thus also be replaced by a fixed network exchange. A SMAP user can use a fixed network terminal equipment, such as a PSTN terminal equipment 35, or a mobile station, such as a GSM terminal equipment 36, in order to set up a connection to the interactive voice response unit 34. This is performed in such a manner, for example, that the terminal equipment 35 or 36 calls a certain directory number which directs the call to the mobile exchange (MSC), which in turn switches the call related signalling to the interactive voice response unit 34. When the call is switched to the interactive voice response unit 34, it guides the user by voice prompts, which are in the form of a menu, for example, whereby the user can make the desired choice by using the keyboard 39 of the terminal equipment 35 or 36 in making an appropriate DTMF response. The interactive voice response unit 34 receives and detects the DTMF response and converts it to a form understood by the SMI. This user interface can be employed when limited amounts of data are updated, for example when service features are activated or deactivated, a choice is made between screening lists or routing alternatives, etc.

The data transfer architecture between the interactive voice response unit 34 and the WWW server 32 and the SMP/SMS is a distributed customer/server solution based on common object request broker architecture (CORBA). CORBA is an architecture defining the object management group. Simply stated, CORBA allows applications to communicate with each other independently of where they are located or who has designed them. This architecture provides a rough basis to open, distributed environments based on standards and capable of growing as the requirements of the operator increase.

The cornerstone of the SMAP architecture of the preferred embodiment of the invention is the service management interface (SMI). The SMI is a high-level generic interface providing external applications, such as the CCB system, with access to the SMP database. The commercially available Nokia IN/SMS products comprise the service management interface. In the present invention, this SMI is employed by the WWW application in the WWW server 32 and the IVR application in the interactive voice response unit 34 and the customer care and billing system (CCB) in order to obtain access to the SMP database.

The graphical user interface portion (the WWW application) of the SMAP architecture is implemented by using normal WWW technology in the server 32. A user can thus access his/her data on the SMP using a normal WWW browser 38 on his/her personal computer (PC). The graphical user interface consists of a set of WWW pages provided in HTML source format. This provides the operator with flexibility to customize the input/output forms using standard HTML language. The operator can, for example, add and modify the pictures and textual parts on the pages. The operator can also choose what information is shown to the user and remove and add data fields related to the intellectual network subscriber data. The server 32 communicates with the SMP/SMS through the SMI using an object request broker (ORB) customer application. The SMP/SMS communicates through the SMI using an ORB server application.

Similarly, the interactive voice response unit 34 communicates with the SMP/SMS through the SMI using an ORB customer application.

The telecommunications protocol employed between the different components of the SMAP architecture of the invention preferably TCP/IP.

When external users are allowed access to service and subscriber data in an intelligent network, special attention must be paid to the security aspects of the system. In the preferred embodiment of the invention shown in FIG. 3, the first security level is provided by the manner in which data is stored and accessed. Critical data in the system (in other words the service and subscriber database) is entirely located in the service management point (SMP) of the intelligent network. The data is not replicated to any other SMAP architecture element. No external user can obtain direct access to the SMP. Instead, the SMP is accessed through an intermediate server, either a WWW server 32 or the IVR server 34.

The next security level is provided by particular security network elements, such as the screening router 33 and the firewall 37.

The WWW server 32 and the interactive voice response unit 34 preferably also perform user authentication based on checking the user ID, password and authority to access. The interactive voice response unit 34 can also support the authentication based on a calling line ID or a MSISDN number.

Furthermore, encryption can be employed between the WWW browser on the user equipment and the WWW server 32.

In addition, application based security control can be employed on the SMI. Every request supplied either from the WWW server 32 or the interactive voice response unit 34 is checked in SMP/SMS by the ORB server. It is thus ensured that the user is authorized to perform the operation. The operation is checked preferably in two manners: Every user profile comprises a definition of the operations allowed for the users related to this particular profile. The other checking mechanism ensures that the user is associated with the data he/she attempts to manipulate. Typically, a subscriber should be allowed to access the service data related to this particular subscriber, but he/she is not able to modify, for example, someone else's service data.

In FIG. 3, the SMAP of the invention is also connected to the subscriber database of a mobile network, in this case to a home location register (HLR). When the above CORBA architecture is employed, the HLR comprises an ORB server application with which the ORB customer of the WWW server 32 or the interactive voice response unit 34 communicates through the SMI. Subscriber data which can be processed in the HLR through the SMAP by the users are, for example, normal GSM network service data. The data to be processed can also comprise an intelligent network service trigger kept subscriber specifically in the HLR. The trigger and its usage are described in PCT/FI95/00601.

In a similar manner as described above in connection with the HLR, any telecommunications network element in which access to existing data is to be allowed to external users can be connected to the SMAP system. It is also to be noted that even though the invention has been described above in connection with intelligent network services, the invention can also be applied to processing conventional telecommunications network service data independently of the existence of an intelligent network. In the case in FIG. 3, for example, the SMAP system of the invention could also be employed for processing merely HLR service data.

In other respects, too, the drawings and the description related to them are only meant to illustrate the present invention. As far as details are concerned, the access system of the invention can vary within the scope of the appended claims.

What is claimed is:

1. A system for processing service data in network elements managing telecommunications services in a mobile communications network, wherein the system is connected to at least one network element managing telecommunication services, said at least one network element including a subscriber database of the mobile communications network, said subscriber database containing telecommunications service data of mobile subscribers, said telecommunications service data comprising call forwarding service data for at least some of the mobile subscribers, the system comprises an open protocol interface to a public data network through which customers and service providers are able to selectively access their telecommunications service data in the mobile communications network.

2. A system as claimed in claim 1, wherein said open protocol interface is implemented by a World Wide Web (WWW) application in a WWW server providing the customers and service providers with access to their service data via World Wide Web by means of a browser.

3. A system for processing service data in network elements managing telecommunications services in a mobile communications network, wherein the system is connected to at least a subscriber database containing telecommunications service data of mobile subscribers of the mobile communications network and connected to other network elements managing the telecommunications services, said telecommunications service data comprising call forwarding service data for at least some of the mobile subscribers, the system comprises an open protocol interface to a public data network through which customers and service providers are able to selectively access their telecommunications service data in the mobile communications network, and the system further comprises an interactive voice response unit connected to an exchange of a telecommunications network in order to provide the customers with an interface through which they have, by means of a fixed or mobile subscriber terminal, access to their own service data in the telecommunications network.

4. A system as claimed in claim 3, wherein the voice response apparatus is arranged to provide a customer with voice prompt menus to which the customer is recommended to response by dual tone multi-frequency responses made from the keyboard of the subscriber terminal, and wherein the voice response apparatus is arranged to receive the customer's dual tone multi-frequency response and deliver the response in the desired form to at least one of said network elements managing the telecommunications services.

5. A system for processing service data in network elements managing telecommunications services in a mobile communications network, wherein the mobile communications network is associated with an intelligent network, said system is connected to at least a subscriber database of the mobile communications network and connected to the service management point of the intelligent network, said telecommunications service data comprising call forwarding service data for at least some of the mobile subscribers, the system comprises an open protocol interface to a public data network through which customers and service providers have a selective access to their telecommunications service data in the mobile communications network.

6. A system for processing service data in network elements managing telecommunications services in a mobile communications network, wherein the system is connected to at least a subscriber database containing telecommunications service data of mobile subscribers of the mobile communications network and connected to other network elements managing the telecommunications services, the system comprises an open protocol interface to a public data network through which customers and service providers are able to selectively access their telecommunications service data in the mobile communications network, and the system further comprises a filtering router allowing only HTTP traffic to pass through to a World Wide Web (WWW) server.

* * * * *